Sept. 18, 1951                R. A. GEISELMAN                2,568,391
                              REGULATING SYSTEM
                              Filed Oct. 12, 1946
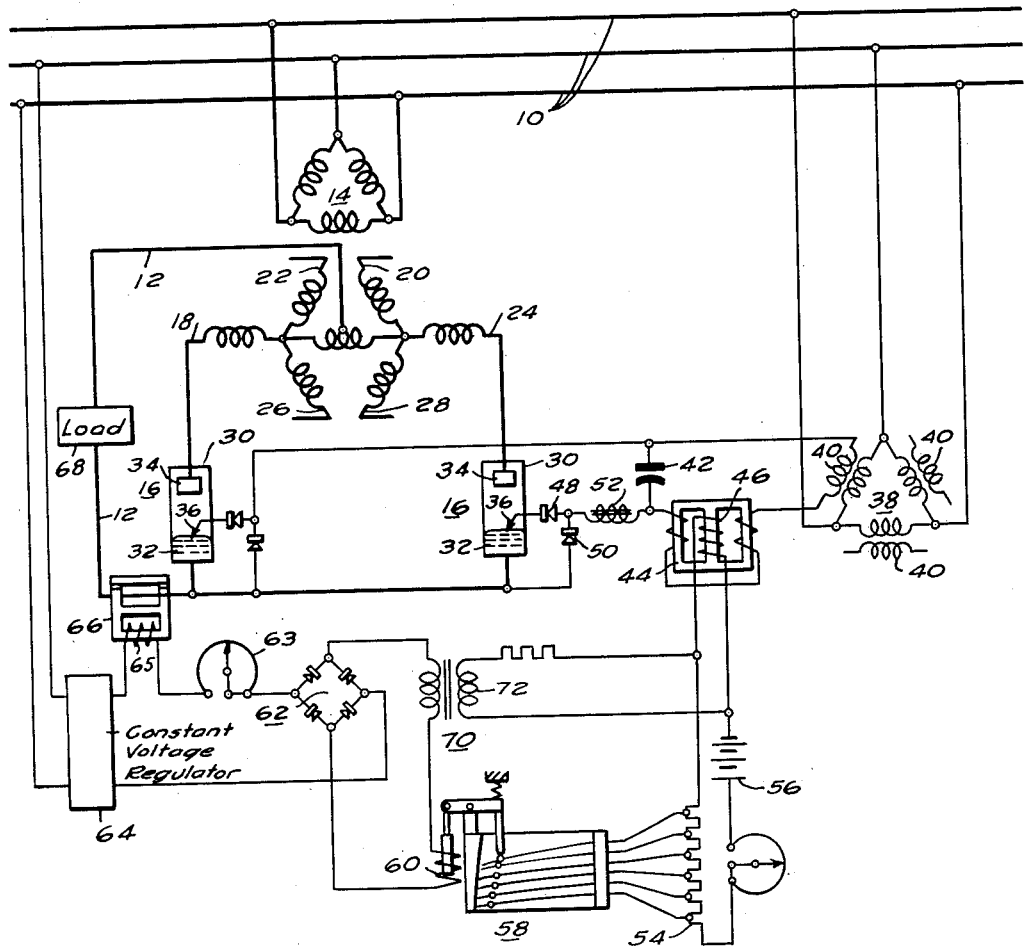
WITNESSES:                                                    INVENTOR
E. A. M'Closkey.                                         Ralph A. Geiselman.
Nw. C. Groome                                                    BY
                                                           James N. Ely
                                                              ATTORNEY Patented Sept. 18, 1951

2,568,391

UNITED STATES PATENT OFFICE 2,568,391

REGULATING SYSTEM

Ralph A. Geiselman, Pittsburgh, Pa., assignor to Westinghouse Electric Corporation, East Pittsburgh, Pa., a corporation of Pennsylvania Application October 12, 1946, Serial No. 703,052

5 Claims. (Cl. 321—38)

This invention relates to regulating systems, and in particular to systems for regulating the load current supplied from a source of direct-current.

An object of this invention is to provide for controlling the load current supplied by a source of direct-current.

Another object of this invention is to provide a simple and dependable regulating system for controlling the output of vapor-electric valves in response to variations of the load current of the system supplied by such valves.

Other objects of this invention will become apparent from the following description when taken in conjunction with the accompanying drawing, the single figure of which is a schematic diagram of circuits and apparatus embodying the teachings of this invention.

Referring to the drawing, an alternating-current circuit 10 is connected to a direct-current circuit 12 by means of a transformer 14, the flow of current through the transformer 14 being controlled by a plurality of vapor-electric valves 16 of the make-alive type, only one pair of alternately-conducting valves 16 being illustrated for purposes of simplicity, although it will be understood that all of the phase terminals 18, 20, 22, 24, 26 and 28 of the connecting transformer 14 will normally be supplied with vapor-electric control valves 16.

Each of the valves 16 comprises an evacuated container 30 enclosing a vaporizable reconstructing cathode 32 of suitable material, such as mercury. Cooperating with the cathode 32 is an anode 34 usually of graphite. An excitation electrode 36 is disposed within the container 30 in normal permanent contact with the cathode 32 for periodically initiating a cathode spot. These cathode initiating electrodes 36 are variously called make-alive electrodes, emersion igniter control members, or simply igniters.

The impulse-supplying system for the make-alive electrodes 36 comprises a source of make-alive potential of the same frequency as the potential applied to the main anodes 34, and herein indicated as the alternating-current circuit 10. The control potential is changed to a desired value by means of a suitable means, such as a transformer 38, preferably provided with substantially independenet secondary windings 40, each of the secondary windings 40 providing control impulses for a pair of alternately-conducting valves 16.

A so-called firing capacitor 42 is connected across the phase winding 40 of the transformer 38 to be charged therefrom, the current flow therefrom to the capacitor 42 being controlled by a three-legged reactor 44. The reactor 44 is provided with a control winding 46 disposed to be energized with direct current for controlling the reactance values of the three-legged reactor 44 to produce a phase shift over a relatively wide range.

The discharge circuit for the firing capacitor 42 includes the make-alive electrodes 36 of a pair of alternately-conducting valves 16 in series opposition, polarity responsive means being provided in the circuit therefor in the form of series shunt rectox type units 48 and 50 for each of the make-alive electrodes 36, so that positive potential will pass through the make-alive electrode 36 while the inverse potential will be shunted around it.

A saturable reactor 52 is connected in the discharge circuit for the capacitor 42 to produce distorted waves having a narrow peaked characteristic. The system preferably charges the capacitor 42 to alternate negative and positive polarities of substantially equal potential. Therefore, the saturable reactor 52 produces substantially symmetrical positive and negative impulses of substantially equal magnitude.

In order to control the phase-shift reactor 44, the direct-current control winding 46 is connected through an adjustable resistor 54 to a source of direct current such as the battery 56. The connections of the resistor 54 are controlled in response to the actuation of a switching mechanism 58 of the type known commercially as the "Silverstat" and disclosed and claimed in patent No. 2,246,301, issued to C. F. Hanna et al., the control winding 60 of the switching mechanism 58 being disposed to be energized in accordance with the load current of valves 16.

As illustrated, the control winding 60 is connected across the output terminals of a full-wave rectifier 62, the input terminals of which are connected to be supplied from a constant voltage regulator 64 which is connected to be supplied from the alternating-current circuit 10. The regulator 64 may be of any of the well known constant voltage regulators available in the open market or of the type exemplified in Patent No. 2,179,353.

Connected in the circuit between the regulator 64 and the full-wave rectifier 62 is an adjustable rheostat 63 and the alternating-current winding 65 of a three-legged reactor 66, the reactance of which is disposed to be controlled by the load current supplied to the load 68 by valves 16. In the embodiment of the reactor 66 illustrated, the direct-current control winding of the reactor comprises the load conductor 12 passing through the magnetic loop of the reactor, it being found that where large currents are encountered such conductor constitutes an effect control winding for the reactor 66 which is provided with a fixed air gap. A damping transformer 70 is connected in the output circuit of the rectifier 62, the primary windings 72 of the transformer being connected across the energizing circuit for the control winding 46 of the phase-shift reactor 44.

In the operation of the system shown, the control potential is supplied to the firing capacitor 42 from the source of control potential and the phase of the current charging the capacitor 42 is controlled by varying the impedance of the three-legged reactor 44. The discharge of the firing capacitor 42 is controlled by the saturable reactor 52 to produce alternate impulses and these impulses are selectively applied to the make-alive electrodes 36 by means of the polarity selective network including the series-shunt unidirectional rectifiers 48 and 50 supplied with each of the make-alive electrodes 36.

The reactor 66 and the switching mechanism 58 are so designed that before any direct current is delivered by the valves 16, current flows from the constant voltage regulator 64 through the alternating-current winding 65 of reactor 66 and the rectifier 62 to provide a flow of direct current in the energizing winding 60 of the switching mechanism 58. The potential thus developed across winding 60 is insufficient to effect the actuation of the switching mechanism 58 to connect sections of resistor 54 in circuit with the control winding 46 of the phase shift reactor 44.

As soon as a load is applied to the output circuit of the valves 16, the current flow in load conductor 12 passing through reactor 66 functions to effect a decrease in the voltage drop across the alternating-current winding 65 of reactor 66 to thereby increase the potential across the input terminals of the rectifier 62 and at the same time increase the energization of winding 60 to effect an operation of the switching mechanism 58. As the load current increases, the current in winding 60 approaches a predetermined value for maintaining the switching mechanism in a normal operating position in which a part of the sections of resistor 54 are shunted from the control circuit for winding 46. Under such conditions the reactor 44 is so controlled that the valves 16 function to deliver a predetermined load current to the load 68 which is to be maintained.

If for any reason the load current flowing in conductor 12 should increase, such increase in the load current causes an increase in the saturation of reactor 66 to effect a decrease in the potential drop across the alternating-current winding 65 thereof and thereby increase the potential across the full-wave rectifier 62. Such increase in the energization of winding 60 to actuate the switching mechanism 58 to connect additional sections of resistor 54 in its related control circuit. The increase in resistance of the control circuit for reactor 44 thus resulting, effects a decrease in the direct current flowing in control winding 46 of reactor 44 to effect a phase shift to cause the valves 16 to fire later and thereby reduce the current flow from valves 16 to the load 68 until it approaches the predetermined value which is to be maintained.

On the other hand, if the load current should be reduced from the predetermined value which is to be maintained, such reduction of current flowing in conductor 12 through the reactor 66 decreases the saturation of reactor 66 with the result that the energization of winding 60 is decreased to effect the shunting of additional sections of resistor 54 to increase the flow of current in the direct-current control winding 46 of reactor 44. The resulting phase shift causes valves 16 to fire earlier and thereby increase the current flow to the load 68 until it approaches the predetermined value which is to be maintained.

The damping transformer 70 is effective under both conditions of operation just described to impress a potential on the circuit for winding 60 which is proportional to the rate-of-change of the potential of the control winding 46 to effectively damp the operation of the switching mechanism 58 and prevent hunting in the control of the load current.

The system of this invention can be employed to control a wide range of current by simply adjusting the size of the fixed air gap of the reactor 66 and adjusting the rheostat 63. For example, with an air gap of .005 inch the current can be controlled at any point between 250 amperes and 670 amperes where the rheostat 63 is an 800 ohm rheostat. By changing the fixed air gap, various ranges of current can be obtained. If the air gap is changed to .154 inch, the current range which can then be controlled by adjusting the rheostat 63 then becomes 1400 amperes to 3350 amperes. Other than varying the fixed air gap and adjusting the rheostat 63, the control of the load current is obtained by employing circuits and apparatus which do not require any unusual adjustments.

I claim as my invention:

1. In a current regulating system for a direct-current load circuit supplied by a pair of alternately-conducting vapor-electric valves from a source of alternating current, the combination comprising, a control system including a phase shifting network for controlling the firing of the valves, a variable reactor in the phase shifting network, a direct-current control winding for the reactor, means disposed to be energized for controlling the current flow in the direct-current control winding, means for supplying a unidirection current to said control means from a constant alternating-current voltage, and another reactor disposed with the load conductor constituting the direct-current control winding thereof, said another reactor having an alternating-current winding connected in series circuit between the constant alternating-current voltage source and the unidirectional current supply means to control the energization of said control means in response to variations in the load current.

2. A system for regulating the direct-current output of a vapor-electric converter comprising an impulse system, a source of alternating control potential for said impulsing system, a phase shifting network interposed between said source of alternating control potential and said impulsing system, said phase shifting network including a variable reactor having a direct-current control winding thereon, means disposed to be energized for controlling the current flow in the direct-current control winding, a source of constant alternating-current potential, means connected between said constant source and said control means for supplying unidirectional current to said control means, and another reactor disposed with the direct-current output conductor of the converter constituting the direct current control winding thereof, said another reactor having an alternating-current winding connected in circuit relation between said constant potential source and said unidirectional current means to control the energization of said control means in response to variations of the direct-current output of the converter.

3. In a current regulating system for a direct-current load circuit supplied by a pair of alternately-conducting vapor-electric valves from a source of alternating-current, the combination comprising, a control system including a phase shifting network for controlling the firing of the valves, a variable reactor in the phase shifting network, a direct-current control winding for the reactor, means disposed to be energized for controlling the current flow in the direct-current control winding, a source of constant alternating-current potential, means connected to said constant source for supplying unidirectional current to said control means, another reactor disposed with the load conductor constituting the direct-current control winding thereof, said another reactor having an alternating-current winding connected in series circuit relation with the constant potential source and the unidirectional current supply means to control the energization of said control means in response to variations in the load current, and means connected in circuit between the unidirectional current supply means and said control means responsive to the rate-of-change of current flowing in the direct-current control winding of the variable reactor to prevent hunting in the operation of said control means.

4. In a current regulating system for a direct-current load circuit supplied by a pair of alternately-conducting vapor-electric valves from a source of alternating current, each of the valves having a control electrode, the combination comprising, a control system connected to the control electrodes, the control system including a variable reactor for controlling the firing of the valves, a direct-current control winding for the reactor, means disposed to be energized for controlling the current flow in the direct-current control winding, means connected to said energizable means for supplying a unidirectional current thereto from a constant alternating-current voltage source, and another reactor having the load conductor constituting the direct-current control winding thereof, said another reactor having an alternating-current winding connected in series circuit between the constant alternating-current voltage source and the unidirectional current supply means to control the energization of the energizable means in response to variations in the load current.

5. In a current regulating system for a direct-current load circuit supplied by a pair of alternately-conducting vapor-electric valves from a source of alternating current, each of the valves having a control electrode, the combination comprising, a control system connected to the control electrodes, the control system including a variable reactor for controlling the firing of the valves, a direct-current control winding for the reactor, a rheostat disposed to be connected in circuit relation with the direct-current control winding of the reactor, actuating means disposed to be energized to control the connections of the rheostat to the control winding of the reactor, a source of constant alternating-current potential, means connected between said constant source and said actuating means for supplying unidirectional current to energize the actuating means, and another reactor having the load conductor constituting the direct-current control winding thereof, said another reactor having an alternating-current winding connected in circuit relation between the source of constant alternating-current potential and the unidirectional current means to control the energization of said actuating means in response to variations in the load current.

RALPH A. GEISELMAN.

REFERENCES CITED

The following references are of record in the file of this patent:

UNITED STATES PATENTS

| Number | Name | Date |
|---|---|---|
| 1,479,561 | Stoekle | Jan. 1, 1924 |
| 2,018,348 | Dijksterhuis | Oct. 22, 1935 |
| 2,079,500 | Foos | May 4, 1937 |
| 2,101,802 | Winograd | Dec. 7, 1937 |
| 2,212,229 | Giroz | Aug. 20, 1940 |
| 2,394,013 | Rose | Feb. 5, 1946 |